United States Patent [19]

Bräunig et al.

[11] Patent Number: 5,082,994
[45] Date of Patent: Jan. 21, 1992

[54] END CONNECTOR FOR CONTACTING AT LEAST TWO SHIELDED CABLES

[75] Inventors: Dieter Bräunig, Stuttgart; Axel Willikens, Waiblingen, both of Fed. Rep. of Germany

[73] Assignee: Daimler-Benz AG, Fed. Rep. of Germany

[21] Appl. No.: 553,619

[22] Filed: Jul. 18, 1990

[30] Foreign Application Priority Data

Jul. 26, 1989 [DE] Fed. Rep. of Germany ....... 3924677

[51] Int. Cl.⁵ ............... H02G 15/10; H01R 43/00; H01R 9/00
[52] U.S. Cl. ............... 174/87; 174/35 C; 174/74 A; 174/77 R
[58] Field of Search ............ 174/87, 74 A, 77 R, 174/35 C

[56] References Cited

U.S. PATENT DOCUMENTS

| | | | |
|---|---|---|---|
| 2,906,810 | 9/1959 | D'Ascoli | 174/87 |
| 3,934,076 | 1/1976 | Smith | 174/87 |
| 4,070,543 | 1/1978 | Thompson et al. | 174/87 |
| 4,343,844 | 8/1982 | Thayer et al. | 174/74 A X |
| 4,625,073 | 11/1986 | Breesch et al. | 174/74 A X |
| 4,795,857 | 1/1989 | McInnis | 174/87 X |

FOREIGN PATENT DOCUMENTS

| | | | |
|---|---|---|---|
| 0052241 | 10/1981 | European Pat. Off. | |
| 1043450 | 11/1958 | Fed. Rep. of Germany | 174/60 |
| 1911213 | 9/1970 | Fed. Rep. of Germany | 174/88 R |
| 3102365 | 10/1982 | Fed. Rep. of Germany | |
| 45070 | 9/1938 | Netherlands | 174/87 |
| 720573 | 12/1954 | United Kingdom | 174/88 R |
| 872706 | 7/1961 | United Kingdom | 174/88 R |
| 982295 | 2/1965 | United Kingdom | 174/88 R |

Primary Examiner—Morris H. Nimmo
Attorney, Agent, or Firm—Evenson, Wands, Edwards, Lenahan & McKeown

[57] ABSTRACT

The present invention relates to an end connector for coupling at least two shielded cables having a plurality of cores, i.e., insulated wires, in such a way that the cables and the cores of the cables are insulated from one another at the connection point. An insulating body defines one or more insulating chambers into which the cables are guided. Desired cores of the cables are electrically coupled at end connection points of the insulating chambers. A cap is coupled to the insulating body to cover the coupled cores. The cap has a metallic outer surface and a hole. The shields of the cables are guided through the hole and electrically coupled to the outer surface.

13 Claims, 1 Drawing Sheet

END CONNECTOR FOR CONTACTING AT LEAST TWO SHIELDED CABLES

BACKGROUND AND SUMMARY OF THE INVENTION

The invention relates to an end connector for contacting at least two shielded cables.

DE-AS 1,043,450 discloses an end connector of the generic type in which cables comprising a plurality of cores i.e., insulated wires, are guided towards a common end connection point by the individual cores of the cables being guided in insulating chambers of an insulating body. In this arrangement, the individual cores of the cables are linked in the insulating chambers of the insulating body to the corresponding other cores of the other cables (for example by twisting). The introduction of the insulated ends of the cores of the cables into the insulating chambers of the insulating body here prevents a short circuit by contacting of the insulated ends of different cores of the cables. A metallic sleeve, which can be filled with casting resin, can in addition be placed over the end connection point.

In this hitherto known end connector disadvantages arise to the effect that screening or shielding of the cables at the end connection point is only possible to a limited extent.

It is an object of the invention to design an end connector for contacting a plurality of shielded cables in such a way that the cables, the connected cores and the shields are insulated from one another at the end connection point and that the end connection point has shielding against external disturbing electromagnetic fields.

This object is achieved according to the invention, in an end connector of the generic type for contacting a plurality of shielded cables, by an arrangement wherein cores of the cables to be connected to one another are insulated from other cores of the cables at a connection point, wherein the cores of the cables to be connected to one another are conductively connected in a manner known per se to form at least one core strand, wherein the cables and the core strand(s) are guided towards the end connection point in insulating chambers of an insulating body, wherein, in the case of a plurality of core strands, the individual core strands are introduced in separate insulating chambers of the insulating body, wherein the insulating body is closed off with a cap for covering the connection points of the cores of the cables, there simultaneously being an electric insulation between the connection points of the cores of the cables and the cap, wherein shields of the individual shielded cables are also connected to one another, wherein the cap is a plastic cap having a metallic outer surface, wherein the plastic cap has a hole through which the connected shields of the individual cables are inserted and then electrically conductively connected to the metallic outer surface, and wherein the plastic cap is surrounded with an insulating layer, the application of which simultaneously entails a fixing of the position of the cables.

A further advantage of the end connector according to the invention compared to the known prior art consists in the fact that the introduction of the cables is simplified since the insulating chambers of the insulating body are initially open at one side.

The end connector according to the invention is designed in such a way that the cables to be contacted are initially guided towards the connection point in duct-shaped insulating chambers which are U-shaped, i.e. are open on one side.

During the introduction of the cables into the end connector according to the invention, it is possible to connect the corresponding cores of the individual cables first of all and then to bend the cables and the core strands, obtained by the connection of the corresponding cores, in such a way that, in shape, they correspond to the course of the insulating chambers of the insulating body according to the invention. This course is essentially such that the cables run toward the end connection point from the same direction, the core strands being bent back in the direction from which the cables run towards the connection point, with the result that they can be introduced into insulating chambers of the insulating body. The connected shields of the cables are taken along further in a direction such that they can be threaded or inserted through a hole in the plastic cap of the end connector according to preferred embodiments of the invention.

In this arrangement, a plurality of cables can be guided towards the connection point in a common insulating chamber. It is also contemplated to bend a core strand in such a way that it is introduced into an insulating chamber in which one or more cables are guided towards the connection point. In this arrangement, a short circuit can in general not occur, because both the cable and the individual cores of the cables are each independently surrounded by an insulation. Thus only the contact points of the individual cores of the cables are uninsulated. In an advantageous embodiment, the insulation of the individual cores of the cables with resect to one another is especially ensured by each of the core strands being introduced into its own special insulating chamber.

In order to close off the insulating body according to the invention, a plastic cap can be placed on when the cables and the core strands have been introduced into the insulating chambers of the insulating body. The plastic cap here has a hole through which the connected shields of the individual cables can be threaded. This plastic cap can, for example, be secured on the insulating body by a clamping device or screw thread.

The plastic cap closing off the insulating body is designed in such a way that it closes off the individual insulating chambers in mutually insulated fashion and has a metallic outer surface which shields the connection points. Particularly advantageous shielding of the cables, even in the region of the end connection point, is achieved if the connected shields of the individual cables are electrically conductively connected to the metallic outer surface of the plastic cap. For this purpose, the shields of the individual cables are attached in a manner known per se to the metallic outer surface of the plastic cap - for example by soldering or by the shields being clamped fast - after the shields have been threaded through the hole in the plastic cap. The plastic cap covering the end connection point must here have a size, particularly as regards the metallic outer surface, such that it protrudes clearly beyond the points at which the connection points of the individual cores of the cables in the insulating chambers are situated. It is also contemplated to guide back the shields of the cables in an insulating chamber of the insulating body in such a way that they protrude from the plastic cap. Shielding of the end connection point can be achieved by the shields being bent around the plastic cap and being electrically conductively secured on the metallic outer surface of the plastic cap. Insulation of the metallic outer surface of the plastic cap can be achieved by surrounding the plastic cap with an insulating material. This insulating material can be secured on the plastic cap in a manner known per se. A contemplated embodiment of this insulation of the plastic cap consists in the use of a heat-shrinkable sleeve, which is placed over the end connection point and then heated. In another embodiment of the insulation of the plastic cap, the metallic outer surface of the plastic cap is coated with a hot-melt adhesive. The advantage of using the hot-melt adhesive consists in the fact that not only is it possible to coat the metallic outer surface of the plastic cap in a simple manner but that, furthermore, the insulating chambers accommodating the cables and core strands can be filled with this hot-melt adhesive, improved fixing of the position of the cables thus being achieved as compared with the use of a heat-shrinkable sleeve.

Other objects, advantages and novel features of the present invention will become apparent from the following detailed description of the invention when considered in conjunction with the accompanying drawings.

DETAILED DESCRIPTION OF DRAWINGS

Figure 1:
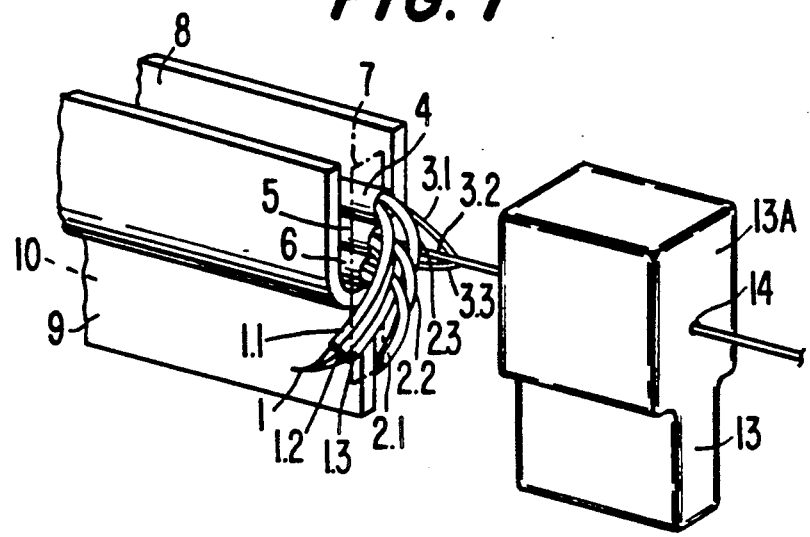
FIG. 1 is an exploded schematic perspective view which shows an end connector constructed according to a preferred embodiment of the invention.

As can be seen from FIG. 1, a plurality of cables 4, 5, 6 are guided towards the end connection point 7 in a common insulating chamber 8. The individual cores 1.1, 1.2, 1.3 and 2.1, 2.2, 2.3 of the cables 4, 5, 6 are electrically conductively connected to one another in a manner known per se such as by twisting the cores together or by employing wire connectors and then bent in such a way that they are introduced into the insulating chambers 9, 10. As an alternative to this, a core strand 1, 2 can be bent in such a way that it is introduced into the insulating chamber 8, in which the cables 4, 5, 6 are guided towards the connection point 7. In this case, it is sufficient if the insulating body illustrated comprises two insulating chambers 8, 9. The shields 3.1, 3.2, 3.3 of the cables 4, 5, 6 are likewise connected to one another and, in this embodiment of the end connector according to the invention, point in the longitudinal direction of the cables 4, 5, 6. In addition, a plastic cap 13 having a metallic outer surface 13A is fitted over the end connection point 7. The plastic cap 13 is secured onto the insulating body in a suitable manner. For example, in an embodiment in which the plastic cap 13 and the insulating body have round cross sections, as shown in FIGS. 2 and 3, the plastic cap 13 can be secured by a screw thread T being cut into the side walls of the insulating chamber 8, 9, 10 and into the inside of the plastic cap 13.

In this case, the plastic cap 13 is screwed onto the insulating body. As an alternative, it is possible to secure the plastic cap 13 by holding the plastic cap 13 on the insulating body with a clamping device.

In the embodiment represented in FIG. 1, the plastic cap 13 is provided with a hole 14, through which the connected shields 3.1, 3.2, 3.3 of the individual cables 4, 5, 6 are inserted. It is then possible to electrically conductively connect the shields 3.1, 3.2, 3.3 of the cables to the screening or shielding metallic outer surface 13A of the plastic cap 13. As an alternative to this, the connected shields 3.1, 3.2, 3.3 of the cables 4, 5, 6 can be guided back so far in an insulating chamber 8, 9, 10 that they protrude from under the plastic cap 13. By bending the connected shields 3.1, 3.2, 3.3 over underneath the plastic cap 13, the shields 3.1, 3.2, 3.3 can be brought into connection with the metallic outer surface 13A of the plastic cap 13 in this case too.

Figure 2:
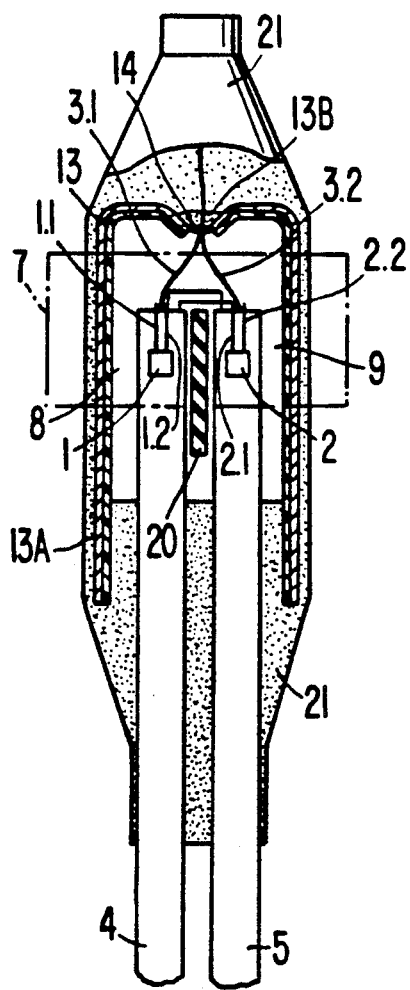
FIG. 2 is a schematic lateral sectional view through an end connector constructed according to another preferred embodiment of the invention.
Figure 3:
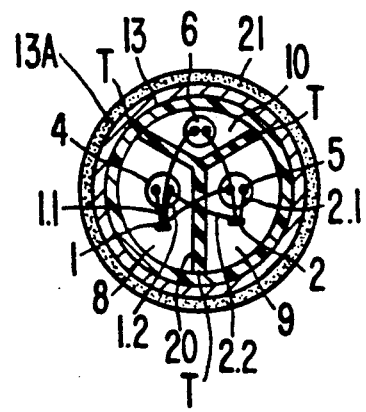
FIG. 3 shows a sectional plan view of an end connector constructed according to another embodiment of the invention.

FIG. 2 represents a lateral section through another end connector constructed according to the invention. In this embodiment, only two cables 4 and 5 can be seen. These cables are guided towards the end connection point 7 in separate insulating chambers 8 and 9. The two insulating chambers 8 and 9 are separated from one another by a partition wall 20. At the end connection point 7, the cores 1.1 and 1.2 and the cores 2.1 and 2.2 of the cables 4 and 5 are connected to form the core strands 1 and 2. The core strands 1 and 2 are bent back and introduced into the insulating chambers 8 and 9. The shields 3.1 and 3.2 are inserted through a hole in the plastic cap 13 and soldered firmly to the metallic outer surface 13A of the plastic cap 13 at solder joint 13B. The end connection point 7 is then covered with a hot-melt adhesive 21, the metallic outer surface of the plastic cap 13 thus being electrically insulated. In addition, the insulating chamber 8 and 9 are thereby at least partially filled, thus ensuring fixing of the position of the cables 4 and 5. Instead of the hot-melt adhesive 21, the end connection point 7 can likewise be covered with a heat-shrinkable sleeve.

FIG. 3 shows a plan view of an end connector according to the invention, in which three cables 4, 5, and 6 are guided towards the end connection point. The insulating chamber 8, 9 and 10 are separated from one another by a partition wall 20. The core strands 1.1. and 2.1 are introduced into the insulating chamber 8 and 9. In addition, the plastic cap 13 is pushed over the end connection point 7. This plastic cap 13 is covered with a hot-melt adhesive 21.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An end connection for coupling a plurality of cables of the type which each have at least one electrically conductive core and an electrically conductive shield disposed about the at least one core, wherein the cores are to be coupled into core strands electrically isolated from each other and all shields are to be coupled together, the end connector comprising:

an insulating body having a plurality of partition walls defining a plurality of insulating chambers for accommodating respective cable core strands, each insulating chamber having an end connection region for accommodating a connection point of the core strands;

a cap coupled to the insulating body to cover the end connection regions, the cap having an inner surface facing the end connection regions and a metallic outer surface, an opening being provided for passing the shields of the cables to be connected from the end connection regions to the outer surface of the cap, wherein the shields are to be electrically coupled to the outer surface; and an insulating layer surrounding the cap for insulating the outer surface of the cap and the shields, and for fixing the position of the cables.

2. An end connector according to claim 1, wherein the insulating body defines a plurality of separate insulating chambers, each separate insulating chamber having a connection region, each of the cables to be connected being guided towards the connection region in a separate insulating chamber.

3. An end connector according to claim 2, wherein the opening is a separate hole in the cap through which the connected shields are threaded for subsequent electrically conductive coupling to the metallic outer surface of the cap.

4. An end connector according to claim 1, wherein at least one core strand is bent in such a way that it is introduced into an insulating chamber, in which at least one cable is guided towards the connection point.

5. An end connector for coupling cables according to claim 1, wherein the cap is a plastic cap having a metallic outer surface.

6. An end connector according to claim 1, wherein the insulating body defines an insulating chamber into which the connected shields of the cables are introduced like a core strand, the cap having a lower edge forming a part of said opening, around which lower edge the connected shields are to be bent and electrically conductively attached to the metallic outer surface of the plastic cap.

7. An end connector according to claim 1, wherein the opening is a separate hole in the cap through which the connected shields are threaded for subsequent electrically conductive coupling to the metallic outer surface of the cap.

8. An end connector according to claim 1, wherein the insulating layer covering the plastic cap comprises a hot-melt adhesive, which at least partially fills the insulating chambers of the insulating body which guide and cables and the core strands.

9. An end connector according to claim 1, wherein the insulating layer covering the plastic cap comprises a heat-shrinkable sleeve placed over the plastic cap and then heated.

10. A method for coupling cables, each cable having at least one electrically conductive core and an electrically conductive shield disposed about the at least one core, the method comprising the steps of:

electrically coupling the cores of cables to be coupled to one another to form at least one core strand, guiding the cables and the at least one core strand toward end connection regions in insulating chambers of an insulating body, closing off the insulating body with a cap which clearly covers the connection regions of the cores of the cables, the cap having a metallic outer surface, there simultaneously being an electric insulation between the connection regions of the cores of the cables and the metallic outer surface of the cap, coupling shields of the individual shielded cables to one another, inserting the coupled shields of the individual cables through an opening to the metallic outer surface of the cap, electrically conductively coupling the shields to the metallic outer surface of the cap, and surrounding the cap with an insulating layer which fixes the position of the cables.

11. A method according to claim 10 wherein the insulating body defines an insulating chamber into which the connected shields of the cables are introduced like a core strand, the cap having a lower edge forming a part of said opening, around which lower edge the connected shields are to be bent and electrically conductively attached to the metallic outer surface of the plastic cap.

12. A method according to claim 10, wherein the opening is a separate hole in the cap through which the connected shields are threaded for subsequent electrically conductive coupling to the metallic outer surface of the cap.

13. A method according to claim 10, wherein the insulating layer covering the plastic cap comprises a hot-melt adhesive, which at least partially fills the insulating chambers of the insulating body which guide the cables and the core strands.

* * * * *